United States Patent
Wedel et al.

(10) Patent No.: US 7,520,799 B2
(45) Date of Patent: Apr. 21, 2009

(54) PROTECTIVE COVER FOR A HAND-HELD CUT-OFF MACHINE

(75) Inventors: Christina Wedel, Bietigheim-Bissingen (DE); Maximilian Eberhardt, Esslingen (DE); Klaus-Martin Uhl, Plochingen (DE); Joachim Hoffmann, Plochingen (DE); Jurgen Erath, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 545 days.

(21) Appl. No.: 11/163,641

(22) Filed: Oct. 26, 2005

(65) Prior Publication Data

US 2006/0128289 A1    Jun. 15, 2006

(30) Foreign Application Priority Data

Oct. 29, 2004   (DE) .................. 10 2004 052 671
Sep. 16, 2005   (DE) .................. 10 2005 044 297

(51) Int. Cl.
  *B24B 55/02*    (2006.01)
(52) U.S. Cl. .................. 451/450; 125/13.01
(58) Field of Classification Search .................. 451/450, 451/449, 454, 455, 358, 359; 125/13.01, 125/14

See application file for complete search history.

(56) References Cited

U.S. PATENT DOCUMENTS

| | | | | |
|---|---|---|---|---|
| 3,896,783 A | * | 7/1975 | Manning | 125/13.01 |
| 4,084,750 A | * | 4/1978 | Fett | 239/600 |
| 4,484,417 A | * | 11/1984 | Klingerman | 451/53 |
| 5,826,478 A | * | 10/1998 | Zerrer | 83/169 |
| 6,916,236 B2 | * | 7/2005 | Terpstra | 451/358 |
| 2004/0042908 A1 | | 3/2004 | Donnerdal | 417/229 |

FOREIGN PATENT DOCUMENTS

SU    1283064 A1    1/1987
WO    02/100597 A1    12/2002

* cited by examiner

*Primary Examiner*—Robert Rose
(74) *Attorney, Agent, or Firm*—Gudrun E. Huckett (57) ABSTRACT

A protective cover of a hand-held cut-off machine has a cover member having an interior. At least two injection nozzles for spraying a cooling liquid into the interior are arranged on the cover member. A supply line for supplying the cooling liquid to the at least two injection nozzles is provided. A bow is arranged outside of the cover member. The supply line has a line section that extends from a first injection nozzle to a second injection nozzle through the bow.

21 Claims, 7 Drawing Sheets

PROTECTIVE COVER FOR A HAND-HELD CUT-OFF MACHINE

BACKGROUND OF THE INVENTION

The invention relates to a protective cover for a hand-held cut-off machine comprising at least two injection nozzles for cooling liquid and comprising a supply line to the injection nozzles.

When performing a cut in stone or similar materials, hand-held cut-off machines generate large amounts of grinding dust that can also be intermixed with coarse particles. For collecting the grinding dust, the particles, and possibly also sparks that are produced, a protective cover is provided that covers the cutting wheel of the cut-off machine partially. Depending on the cut to be performed, such cut-off machines are positioned at different angular positions relative to the material to be cut. For adjusting the various angular positions, the corresponding protective covers are designed to be pivotable. A handle on the protective cover enables the adjustment of the desired pivot position.

Numerous cutting tasks are performed preferably as a wet cut. A cooling liquid, for example, in the form of water, is supplied to the cutting wheel and the cutting area by means of injection nozzles. The water serves for binding the dust and for cooling the cutting wheel.

U.S. 2004/0042908 A1 discloses a hand-held cut-off machine that has a protective cover provided on its sides with an injection nozzle for the cooling liquid, respectively. Hose lines that are branched in a Y-shape lead to the injection nozzles wherein one of the hose lines is guided about the circumferential wall of the protective cover to the oppositely positioned injection nozzle. The flexible hose lines are difficult to secure in place. In the case of difficult cutting tasks as well as when adjusting the angular position of the protective cover, they can be in the way or can become damaged.

SUMMARY OF THE INVENTION

It is an object of the present invention to further develop a protective cover of a hand-held cut-off machine so that a simple handling under wet cutting conditions is provided.

In accordance with the present invention, this is achieved in that a line section of the supply line extends from the first injection nozzle to the second injection nozzle through a bow that is arranged outside of the protective cover.

A protective cover with at least two injection nozzles is proposed wherein a line section of the supply line from the first injection nozzle to the second injection nozzle extends through the bow that is arranged on the exterior of the protective cover. In particular, the bow is embodied as a handle. The line section is fixed within the area of the bow and is protected against external mechanical effects. In operation of the cut-off machine and particularly when adjusting the protective cover by means of the bow, the correlated line section is not in the way so that it neither is disruptive nor exposed to the risk of becoming damaged.

In an advantageous further embodiment, the bow extends from the first injection nozzle to the second injection nozzle wherein the line section between the two injection nozzles is integrated completely into the bow. In particular, the two injection nozzles are enclosed by the bow. A compact integrated module is formed that can be manufactured with minimal expenditure and can be easily mounted. The proposed construction is well protected from becoming damaged by avoiding exposed line sections, nozzle components or the like. In particular, there is the possibility of shaping in accordance with the contour of the protective cover so as to avoid projecting parts. A disruptive catching during work is prevented.

In a preferred embodiment, the bow is attached by means of the injection nozzle on the protective cover. In particular, the bow engages positive-lockingly by means of a hollow peg an opening of the protective cover. For attaching it, the injection nozzle that is embodied as a screw dowel is screwed into the hollow peg. Mounting is easily done in that the hollow peg, for example, snaps lockingly into place in a corresponding opening of the protective cover so that at least a provisional attachment of the bow is provided. By screwing in the injection nozzle that is embodied as a screw dowel, the hollow peg is spread apart or at least stiffened to such an extent that it is secured fixedly and highly loadably within the cover opening. The injection nozzle is at the same time also a fastening means so that the manufacturing and mounting expenditure is reduced.

In an advantageous alternative, the injection nozzle is in the form of a hollow screw that interacts with an inner thread; by means of the hollow screw the bow is screw-connected to the protective cover. Screwing in the outer thread of the injection nozzle into the inner thread enables a simple mounting action without having to expend the force for a self-cutting thread. The inner thread can be provided directly in a wall of the protective cover. Preferably, a nut, in particular embodied as a square nut, is provided with the inner thread and is secured positive-lockingly in the protective cover. When tightening the screw connection, the positive-locking attachment of the nut requires only a rotation of the injection nozzle since the nut is secured against rotation. Independent of the load of the screw connection, the protective cover can be manufactured of lightweight material wherein for the separate nut a correspondingly hard and loadable material is selected. The bow is attached with a high securing force and can withstand high loads. Even when releasing and securing the screw connection multiple times, for example, for servicing purposes, the thread remains undamaged. An exchange of parts is not required.

In an advantageous embodiment, the two injection nozzles are arranged opposite one another on two lateral surfaces of the protective cover wherein the bow with a U-shaped line portion engages across the circumferential wall and partially the sidewalls of the protective cover. The two opposed injection nozzles ensure a uniform wetting of the cutting wheel on both sides. The fluid connection between the two injection nozzles is provided by the U-shaped line portion. Because of the U-shape of the line portion, particularly in connection with the attachment on the two injection nozzles, an intimate and highly loadable connection between the bow and the protective cover results. Bow and protective cover can be designed to be correspondingly lightweight while taking into consideration the operational loads that are expected.

The protective cover has expediently an approximately radially extending stepped configuration against which the U-shaped line portion of the bow rests. The stepped configuration can serve as a mounting aid and causes at the same time a stiffening of the protective cover that, in turn, can also contribute to weight savings. The U-shaped line portion can hug at least partially the stepped configuration so that it projects less from the lateral contour of the protective cover and, in this way, is exposed to a lesser degree to external influences.

The bow has expediently in the area of the circumferential wall an annular bow handle that, in particular, projects radially outwardly. The bow handle can be gripped ergonomically and protects at the same time the inwardly positioned line section in the area of the circumferential wall of the protective cover against impact loads or the like.

In an advantageous further embodiment, the bow with U-shaped line section is attached positive-lockingly on the circumferential wall of the protective cover. In combination with the U-shaped configuration and the attachment of the two free ends of the U by means of the injection nozzles, a spatially defined three-point attachment results that is highly loadable in all directions.

For this purpose, the circumferential wall has expediently a unitary radially projecting thicker portion that engages a correlated depression of the bow. In addition, it can be expedient to screw-connect the bow to the circumferential wall of the thicker portion. The positive-locking connection of the thicker portion and the depression leads to a precise non-yielding positional fixation of the bow that can be secured additionally by a screw connection. The thicker portion enables receiving of a corresponding thread for the screw connection while externally thereto the protective cover is thin-walled and lightweight.

In an advantageous embodiment, the bow in the area of the line section between the two injection nozzles is configured as a flat pipe. The outer surface facing the protective cover rests areally against the protective cover. The opposite outer surface, relative to the cross-section of the flat pipe, is positioned relative to the surface of the protective cover at an angle of >90°. The areal contact on the protective cover prevents penetration and deposition of dirt, dust or the like. The slanted transition from the protective cover surface to the external flat pipe surface is of a uniformly flowing design, at least approximately. In the case of operational accidental contacts, external objects can slide off without damaging the line section.

It can also be advantageous to configure the injection nozzle and/or a connecting member, particularly together with a nipple for a hose line, as a monolithic part of the bow. Expediently, the bow is connected positive-lockingly to the protective cover, particularly by means of the hollow peg. The number of components is reduced. Mounting can be realized in a simple way, for example, by snapping on the bow on the protective cover.

DESCRIPTION OF THE PREFERRED EMBODIMENTS

Figure 1:
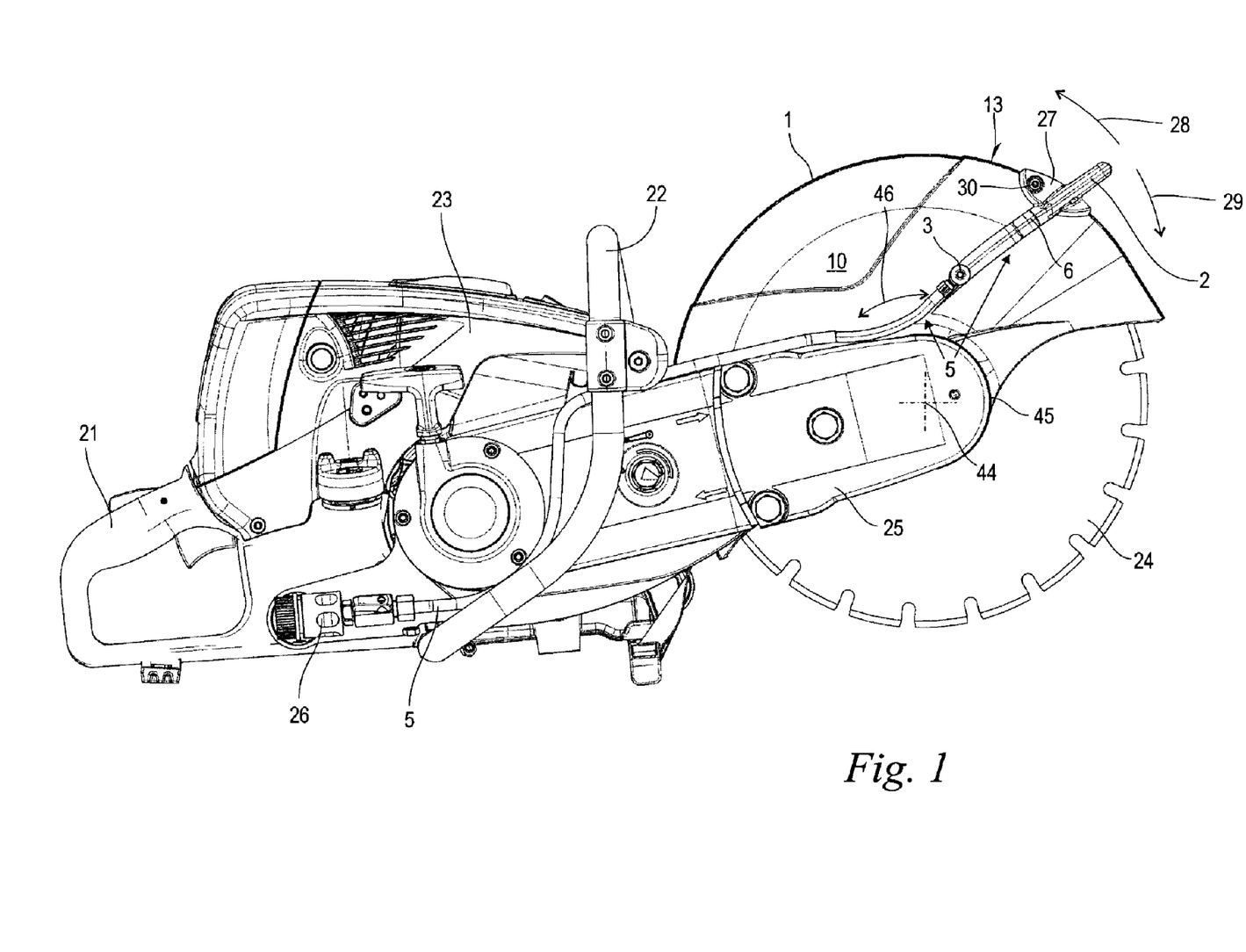
FIG. 1 shows in a side view a hand-held cut-off machine provided with a protective cover having a bow embodied as a handle arranged thereat and a water supply integrated in the bow.

FIG. 1 shows in a side view a cut-off machine with a motor housing 23 in which an internal combustion engine, not illustrated in detail, is arranged as a drive motor for a cutting wheel 24. On the motor housing 23 a rear grip 21 and a front grip 22 are attached that are provided for guiding the cut-off machine by hand. The cutting wheel 24 is rotatingly driven by the drive motor, not illustrated, by means of a belt drive 25 about an axis of rotation 44.

A protective cover 1 is attached in a hub area 45 of the cutting wheel 24 so that it covers the cutting wheel 24 laterally and in the area of its circumference about an angular range of approximately 180°. The protective cover 1 is attached to be adjustable and can be swivelled as needed in the direction of double arrow 46 about the hub area 45 or the axis of rotation 44 into the desired operating position. For adjusting the swivel position, a bow 2 in the form of a handle is attached to the protective cover 1; the manual forces required for adjustment can be supplied with the bow.

Figure 3:
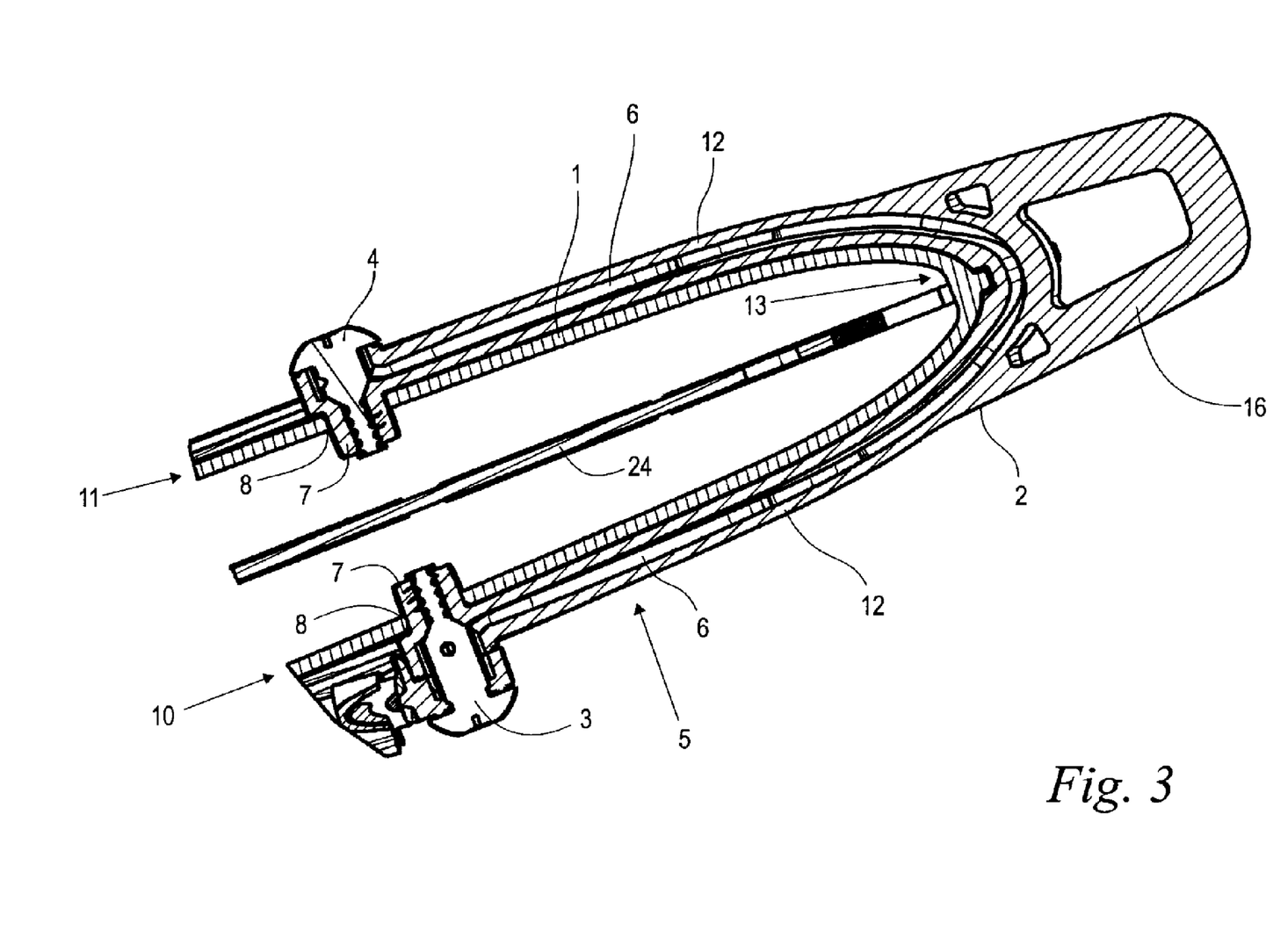
FIG. 3 shows in an enlarged detail view in section the protective cover according to FIG. 1 in the area of the bow with the line section integrated therein.

The protective cover 1 has a cover member with sidewalls 10, 11 and a circumferential wall 13. On the sidewall 10 of the cover member of the protective cover 1 an injection nozzle 3 for a cooling liquid is arranged. A further injection nozzle 4, not illustrated, is provided on the opposite sidewall 11 that cannot be seen in FIG. 1; the nozzle 4 will be explained in more detail in the following. A supply line 5 is provided at the inlet side with a hose coupling 26 and extends to the injection nozzle 3. A line section 6 of the supply line 5 extends from the first injection nozzle 3 through the bow 2 to the second injection nozzle 4 (FIG. 3). The bow 2 can also be designed without grip function. Through the supply line, for example, water as a cooling liquid can be supplied to the injection nozzles 3, 4 and from there guided onto the cutting wheel 24 as a cooling medium and as a binding medium for dust.

Figure 5:
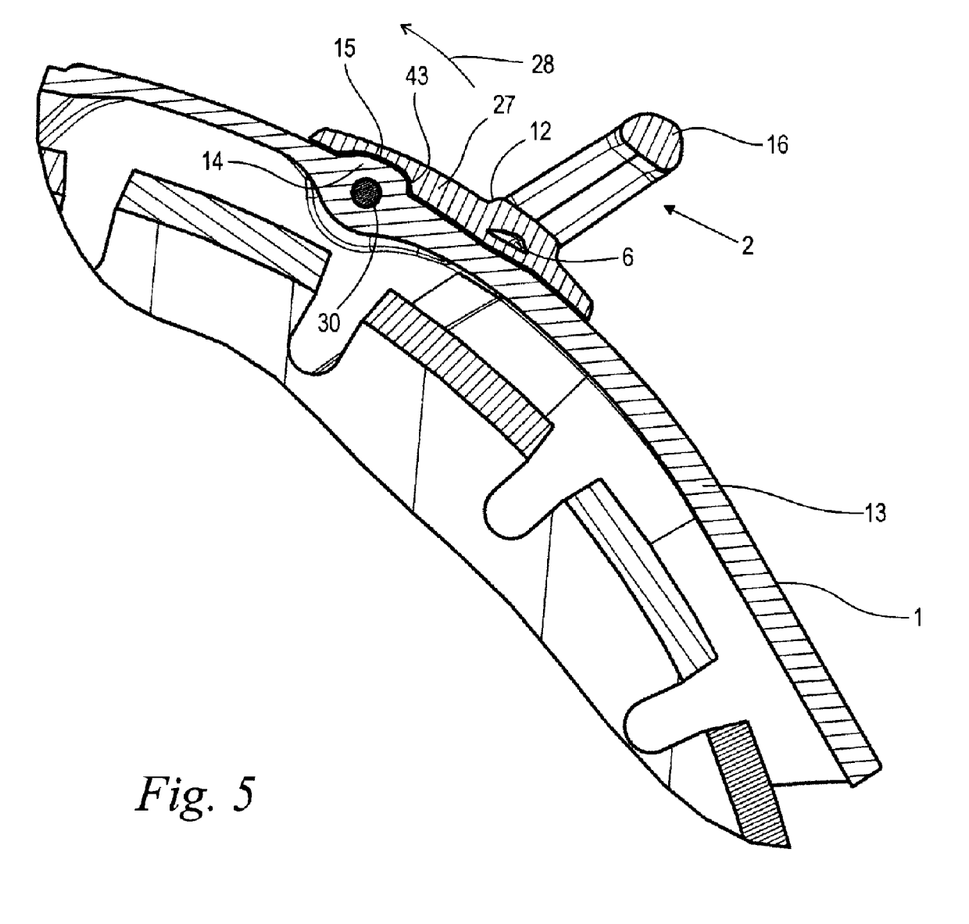
FIG. 5 is a detail illustration in longitudinal section of the handle of the protective cover according to FIG. 1 with details in regard to the positive-locking attachment of the bow on the circumferential wall.
Figure 6:
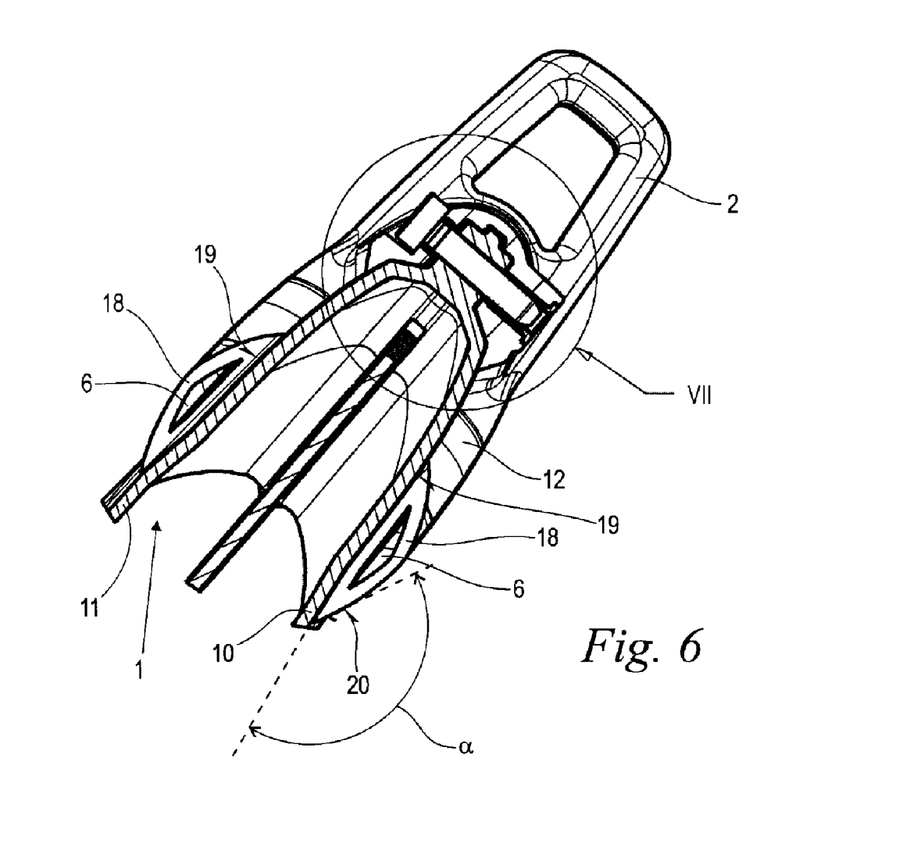
FIG. 6 is a cross-sectional illustration of the arrangement according to FIG. 5.
Figure 7:
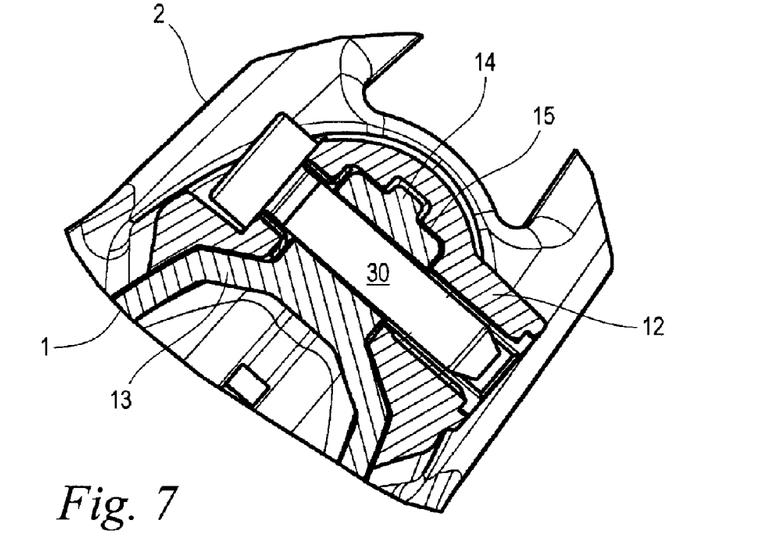
FIG. 7 shows the detail VII according to FIG. 6 with details regarding the combined positive-locking and screw attachment of the bow in the circumferential area of the protective cover.

The bow 2 is attached by means of the injection nozzle 3 and the oppositely positioned injection nozzle 4 shown in FIG. 3 to the protective cover 1. The bow 2 moreover has an areal contact section 27 arranged circumferentially relative to the protective cover 1 with which the bow 2 rests against the protective cover 1 in the area of its circumferential wall 13. By means of the contact section 27, the bow 2 is supported in the pivot direction indicated by arrow 29 about the injection nozzles 3, 4. For support in the opposite direction indicated by arrow 28, a positive-locking attachment, explained in more detail in connection with FIGS. 5 through 7, is provided that is secured by screw 30.

Figure 2:
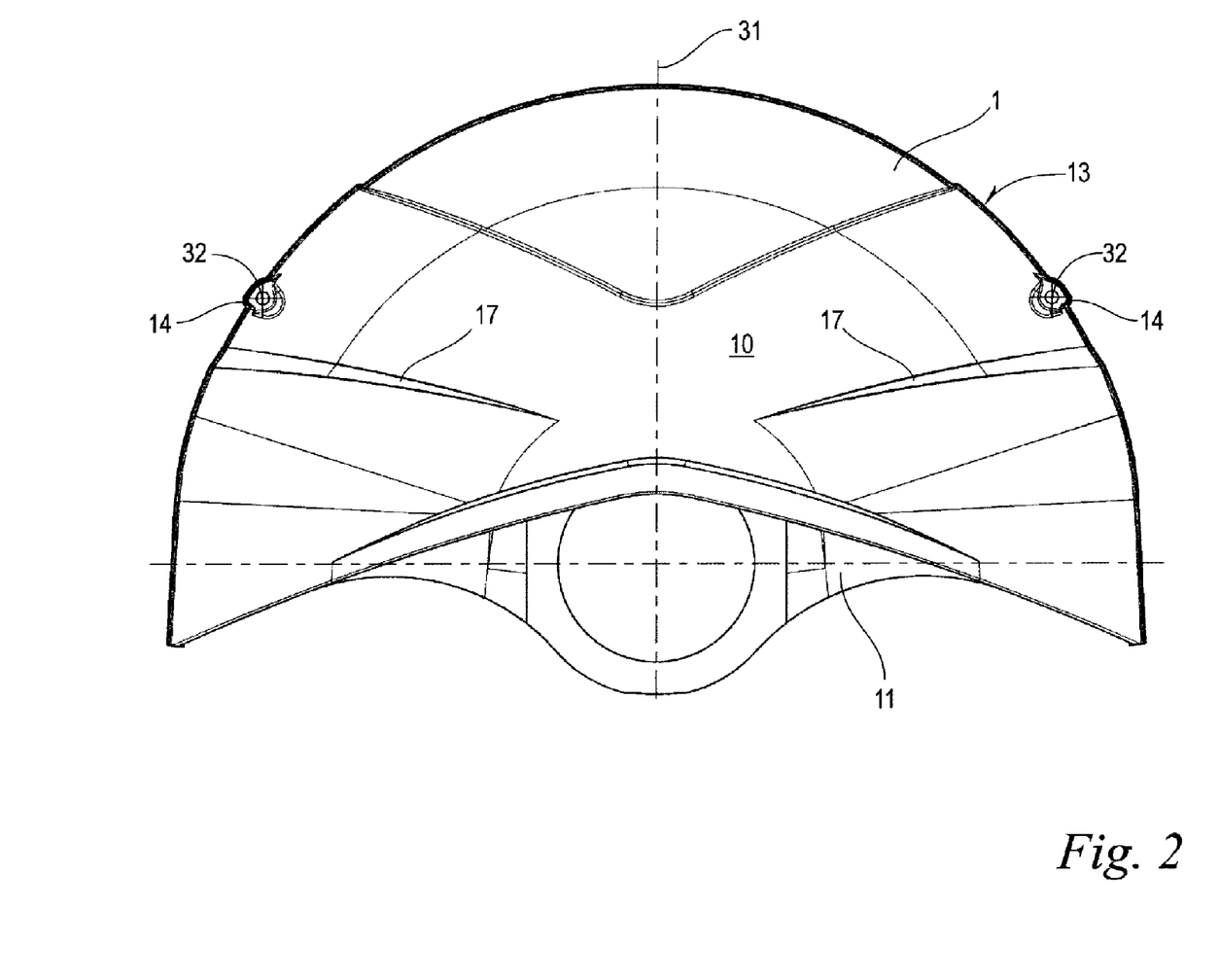
FIG. 2 shows in an enlarged illustration details of the protective cover of the cut-off machine according to FIG. 1.

FIG. 2 shows in an enlarged illustration the protective cover 1 according to FIG. 1 as a detail; accordingly, the protective cover 1 is designed symmetrical to a center line 31. The cover member has a circumferential wall 13 that is provided symmetrical to the central line 31 with a radially outwardly projecting thicker portion 14 on both ends, respectively; a screw hole 32 extends transversely through the thicker portion, respectively. The thicker portion 14 is formed as a unitary part of the circumferential wall 13. On either side of the central line 31, a substantially radially projecting step 17 is provided on both sidewalls 10, 11, respectively.

FIG. 3 shows in an enlarged cross-sectional illustration a detail of the protective cover 1 according to FIG. 1 in the area of the bow 2. The two injection nozzles 3, 4 are arranged symmetrically relative to one another and opposite one another in the two lateral surfaces 10, 11 of the protective cover 1. The bow 2 has a U-shaped line portion 12 with which the bow 2 is guided across a lateral surface 10 about the circumferential wall 13 and along the additional lateral surface 11. The two injection nozzles 3, 4 are arranged in the free legs of the U-shaped line portion and are integrated into the line portion 12.

The line section 6 extends from the first injection nozzle 3 to the second injection nozzle 4 and is integrated completely into the U-shaped line portion 12 of the bow 2. The bow 2 in this way provides a flow-conducting fluid connection between the first injection nozzle 3 and the sidewall 10 to the second injection nozzle 4 on the opposed sidewall 11. The line section 6 of the supply line 5 is guided in accordance with the shape of the U-shaped line portion 12 across the lateral surfaces 10, 11 and about the circumferential wall 13. It can also be expedient to have the line section 6 extend only partially through the bow 2.

The bow 2 is embodied as a plastic part and produced by gas injection technology (GIT) for forming the integrated line section 6. Radially outwardly of the circumferential wall 13, a ring-shaped bow handle 16 that points outwardly is provided as an integral part of the bow 2. The free legs of the U-shaped line portion each have an inwardly oriented hollow peg 7 formed as an integral part; by means of the pegs the bow 2 can be positive-lockingly snapped into place into opposed openings 8 of the protective cover 1. The two hollow pegs 8 receive the injection nozzles 3, 4 that are oriented inwardly toward the cutting wheel 24. The U-shaped line portion 12 of the bow 2 is positioned in the mounted state on the lateral, radially extending steps 17 (FIG. 2) of the protective cover 1.

Figure 4:
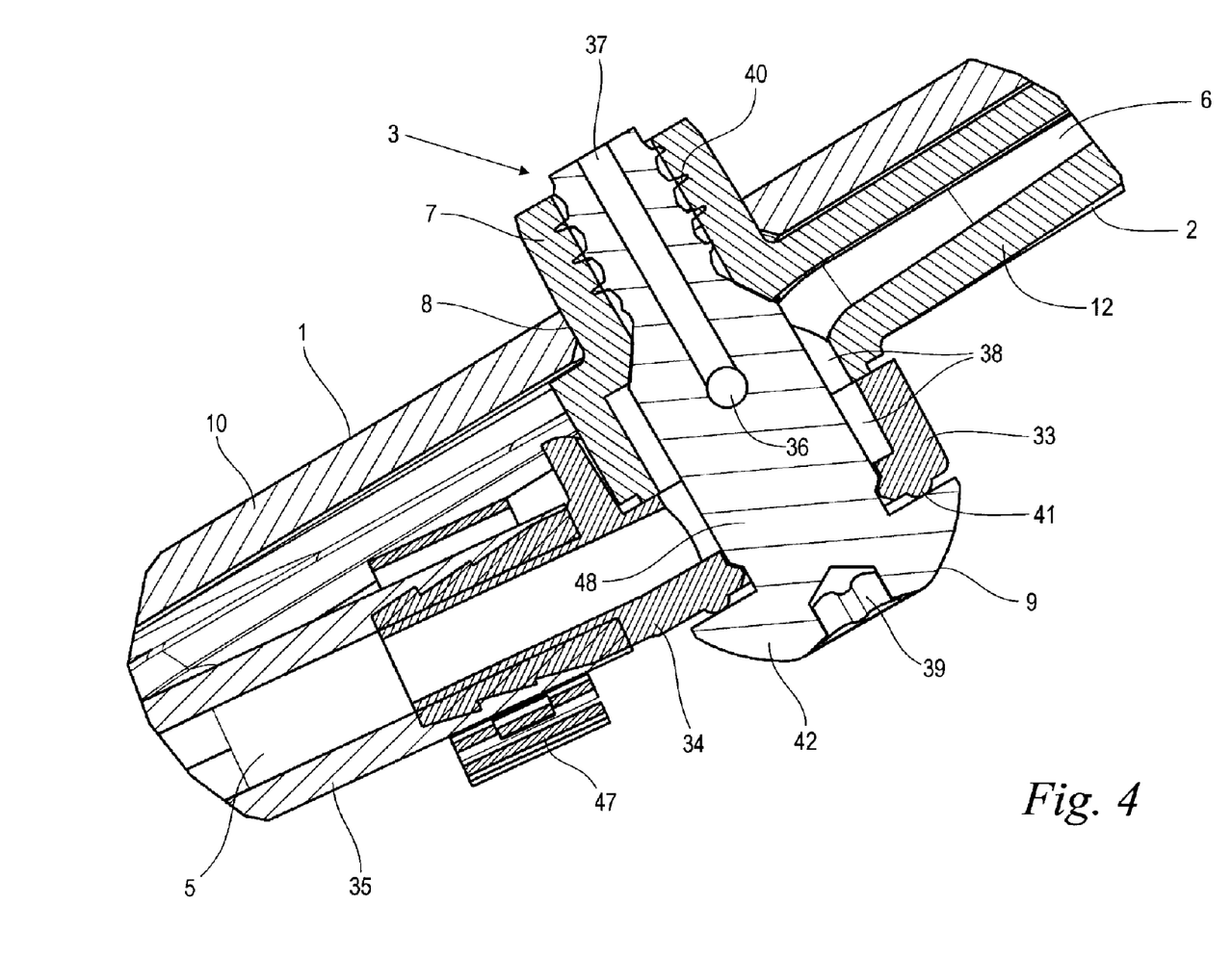
FIG. 4 is an enlarged section illustration of the injection nozzle according to FIG. 3 at the supply side.

FIG. 4 shows enlarged details of the arrangement of FIG. 3 in the area of the injection nozzle 3. In the illustrated embodiment, the injection nozzle 3 is a screw dowel 9 and has at its end facing the cutting wheel 24 (FIG. 3) a self-cutting thread 40. The screw dowel 9 is screwed by means of the self-cutting thread 40 into the hollow peg 7 so that the free ends of the U-shaped line portion 12 of the bow 2 are attached to the protective cover 1. The thread 40 spreads the hollow peg 7 radially outwardly so that it is secured by clamping action in the opening 8. It can also be expedient to embody one or both injection nozzles 3, 4 as a monolithic part of the bow 2. In this connection, the bow 2 can be attached in particular with the integral hollow pegs 7 positive-lockingly on the protective cover 1 in that the hollow pegs 7 are locked, for example, by looking noses or the like in the corresponding openings 8.

At the exterior, the injection nozzle 3 has a head 42 with a hexagon socket 39 by means of which the injection nozzle 3 can be screwed in. Between the head 42 and the free end of the line portion 12 a connecting member 33 having an integral nipple 34 is clamped. A section of the supply line 5 in the form of a hose 35 is slipped onto the nipple 34 and secured by means of a hose clamp 47. The head 42 rests areally and sealingly on a circumferential annular bead 41 of the connecting member 33. The connecting member 33 and also the nipple 34 can be formed as monolithic parts of the bow 2.

The injection nozzle 3 has a cylindrical center section 48 that, in the area of the connecting member 33 and the free end of the line portion 12, is surrounded by an annular chamber 38. In the area of the center section 48, the injection nozzle 3 is provided with a transverse bore 36 that opens into the annular chamber 38. The transverse bore 36 is connected to a longitudinal bore 37. By means of the annular chamber 38 and the bores 36, 37, a flow-conducting connection of hose 35 through the injection nozzle 3 into the interior of the protective cover 1 is formed. The annular chamber 38 also provides a flow-conducting connection to the line section 6 formed within line portion 12 so that a flow-conducting connection from the supply line 5 to the opposed injection nozzle 4 (FIG. 3) is provided. The opposed arrangement of the injection nozzle 4, with the exception of the connecting member 33, is constructed identically, at least analogously, to the illustrated arrangement of the injection nozzle 3.

FIG. 5 shows a longitudinal section illustration of the arrangement according to FIG. 3 in the area of the bow handle 16. The contact section 27 of the bow 2 is provided with a concave depression 15 that is engaged flush by the thicker portion 14 of the circumferential wall 13 of the protective cover 1. The thicker portion 14 and the matchingly shaped depression 15 are provided with a flank 43 whose angular position is designed such that a positive locking connection between the bow 2 and the circumferential wall 13 relative to the pivot direction 28 is provided. For an additional attachment in this area, a screw connection is provided in that a screw 30 passes through the thicker portion 14.

The illustration according to FIG. 5 also shows that the line portion 12 with the line section 6 that is flat in cross-section is protected by the bow grip 16 radially outwardly relative to the circumferential wall 13.

FIG. 6 shows a cross-section illustration of the arrangement according to FIG. 5 with slantedly cut legs of the U-shaped line portion 12. In the area of its legs the line portion 12 of the bow 2 is formed as a flat pipe 18 whose cross-section has two acutely angled corners. Flat outer surfaces 19, 20 extend between the two acutely angled corners. The outer surfaces 19 facing the protective cover 1 rest areally on the sidewalls 10, 11 of the protective cover 1, respectively, up to the acutely angled corners. The oppositely positioned outwardly pointing outer surfaces 20 are positioned in the transition area to the adjoining sidewalls 10, 11 at an angle a to their sidewall surfaces, wherein the angle in the illustrated embodiment is significantly greater than 90 °.

The detail according to FIG. 6 is illustrated enlarged in FIG. 7. Accordingly, the thicker portion 14 on the circumferential wall 13 of the protective cover 1 in cross-section is approximately rectangular and is surrounded by the depression 15 of the bow 2 having a matching shape. Transversely thereto the screw 30 is screwed through so that the line portion 12 is spatially fixed in all directions on the circumferential wall 13.

Figures 8, 9:
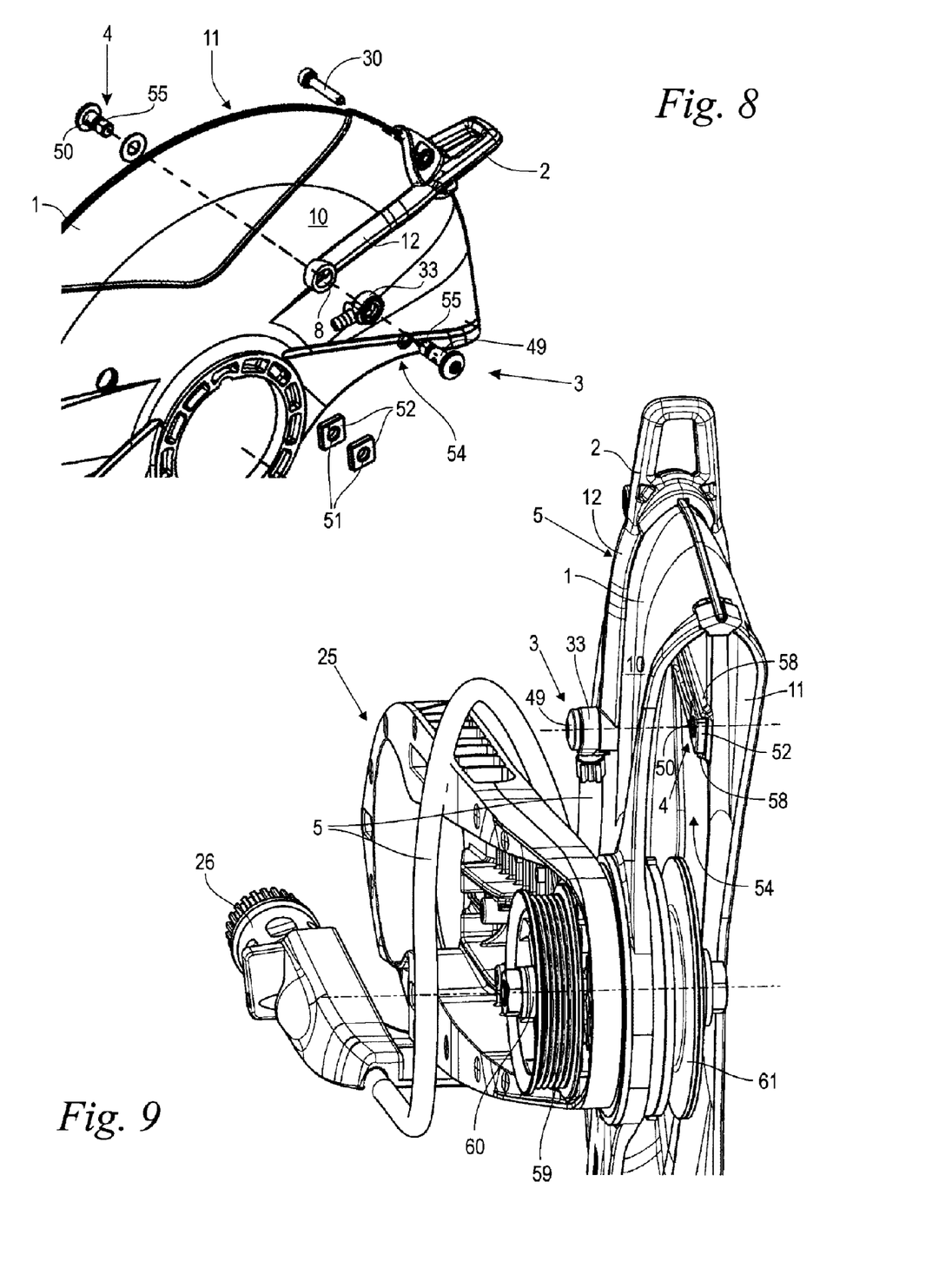
FIG. 8 is an exploded perspective illustration of a detail of the protective cover with injection nozzles embodied as hollow screws.
FIG. 9 is a perspective inner view of the protective cover according to FIG. 8 with positive-lockingly secured square nuts for screw-connecting the injection nozzles.

FIG. 8 shows a detail of a further embodiment of the protective cover 1 according to the invention in a perspective exploded illustration; the bow 2 with its line portion 12 is pushed onto the protective cover like a fork. A screw 30 arranged in the axial direction as well as the two injection nozzles 3, 4 are provided for attaching the bow 2. The injection nozzles 3, 4 are inserted through openings 8 from the exterior to the interior wherein a connecting member 33 is interposed in the case of the injection nozzle 3. The injection nozzles 3, 4 are hollow screws 49, 50 with an outer thread 55 at the end, respectively, which end is to be positioned in the interior 54 of the protective cover 1. In the interior 54 of the protective cover 1, the two injection nozzles 3, 4 are secured by a screw connection by means of nuts 52 that are embodied as square nuts in the illustrated embodiment. The nuts 52 have an inner thread 51, respectively, for receiving the outer thread 55 of the hollow screws 49, 50. It can also be expedient to provide the inner threads 51, for example, in the sidewalls 10, 11 of the protective cover 1 in the area of the openings 8. For this purpose, the inner thread 51 can be cut directly into the material of the protective cover 1 or inserted as a threaded insert.

FIG. 9 shows a perspective inner view of the protective cover 1 according to FIG. 8 together with parts of the belt drive 25. The belt drive 25 comprises a pulley 59 with a drive shaft 60 on which a hub 61 for receiving the cutting wheel 24 illustrated in FIG. 1 is arranged. About half of the hub 61 with the cutting wheel 24, not illustrated here, is enclosed in the radial direction by the protective cover 1 wherein the cutting wheel 24 (FIG. 1) rotates in the interior 54 of the protective cover 1.

From the hose coupling 26 the supply line 5 extends in the form of a hose and opens by means of the connecting member 33 into the injection nozzle 3. From here a partial stream of the cooling medium in the supply line 5 is supplied through the line portion 12 of the bow 2 to the oppositely positioned injection nozzle 4. By means of the two injection nozzles 3, 4 the cooling medium is sprayed onto the cutting wheel 24 (FIG. 1) rotating in the interior 54. In the interior 54, the nuts 52 rest areally against the sidewalls 10, 11 and are secured positive-lockingly by means of radially extending bars 58, provided as monolithic parts of the sidewalls 10, 11, in such a way that they are secured against being turning. The bars 58 can also be shaped like clamps extending inwardly toward the nuts 52. The nuts 52 can then be radially inserted for mounting and are secured or fastened in the inserted state in the axial direction and against rotation. The injection nozzles 3, 4 that are formed as hollow screws 49, 50 are passed from the exterior to the interior through the legs of the bow 2 and the sidewalls 10, 11 of the protective cover 1 from the exterior to the interior and screwed with their outer threads 55 into the inner threads 51 (FIG. 8) of the nuts 52. Accordingly, the injection nozzles 3, 4 and the bow 2 in the area of its legs are screw-connected simultaneously to the protective cover 1. Instead of the illustrated square nuts, the nuts 52 can also be hexagon nuts or threaded base plates that are shaped in other ways.

While specific embodiments of the invention have been shown and described in detail to illustrate the inventive principles, it will be understood that the invention may be embodied otherwise without departing from such principles.

What is claimed is:

1. A protective cover of a hand-held cut-off machine, the protective cover comprising:
   a cover member having an interior;
   at least two injection nozzles for spraying a cooling liquid into the interior arranged on the cover member;
   a supply line for supplying the cooling liquid to the at least two injection nozzles;
   a bow arranged outside of the cover member;
   wherein the supply line has a line section that extends from a first one of the at least two injection nozzles to a second one of the at least two injection nozzles through the bow;
   wherein the bow is embodied as a handle for adjusting the cover member.

2. The protective cover according to claim 1, wherein the bow extends from the first injection nozzle to the second injection nozzle and wherein the line section is integrated completely into the bow.

3. The protective cover according to claim 2, wherein the at least two injection nozzles are enclosed by the bow.

4. The protective cover according to claim 3, wherein the at least two injection nozzles secure the bow to the protective cover.

5. The protective cover according to claim 4, wherein the bow has hollow pegs formed as an integral part of the bow and engaging positive-lockingly an opening of the cover member, respectively, wherein the at least two injection nozzles are screw dowels screwed into the hollow pegs, respectively.

6. The protective cover according to claim 4, wherein the at least two injection nozzles are hollow screws adapted to cooperate with an inner thread, wherein the bow is screw-connected to the cover member by the screws.

7. The protective cover according to claim 6, further comprising a nut that is provided with the inner thread and is positive-lockingly secured on the cover member.

8. The protective cover according to claim 7, wherein the nut is a square nut.

9. The protective cover according to claim 1, wherein the cover member has two opposed sidewalls and a circumferential wall and wherein the at least two injection nozzles are arranged opposite one another on the two opposed sidewalls, wherein the bow has a U-shaped line portion forming the line section of the supply line and wherein the U-shaped line portion of the bow surrounds the circumferential wall and partially the two opposed sidewalls.

10. A protective cover of a hand-held cut-off machine, the protective cover comprising:
    a cover member having an interior;
    at least two injection nozzles for spraying a cooling liquid into the interior arranged on the cover member;
    a supply line for supplying the cooling liquid to the at least two injection nozzles;
    a bow arranged outside of the cover member;
    wherein the supply line has a line section that extends from a first one of the at least two injection nozzles to a second one of the at least two injection nozzles through the bow;
    wherein the cover member has two opposed sidewalls and a circumferential wall and wherein the at least two injection nozzles are arranged opposite one another on the two opposed sidewalls, wherein the bow has a U-shaped line portion forming the line section of the supply line and wherein the U-shaped line portion of the bow surrounds the circumferential wall and partially the two opposed sidewalls;
    wherein the bow has an annular bowhandle in the area of the circumferential wall.

11. The protective cover according to claim 10, wherein the bow handle points radially outwardly.

12. protective cover of a hand-held cut-off machine, the protective cover comprising:
    a cover member having an interior;
    at least two injection nozzles for spraying a cooling liquid into the interior arranged on the cover member;
    a supply line for supplying the cooling liquid to the at least two injection nozzles;
    a bow arranged outside of the cover member;
    wherein the supply line has a line section that extends from a first one of the at least two injection nozzles to a second one of the at least two injection nozzles through the bow;
    wherein the cover member has two opposed sidewalls and a circumferential wall and wherein the at least two injection nozzles are arranged opposite one another on the two opposed sidewalls, wherein the bow has a U-shaped line portion forming the line section of the supply line and wherein the U-shaped line portion of the bow surrounds the circumferential wall and partially the two opposed sidewalls;
    wherein the cover member has an approximately radially extending step against which the U-shaped line portion of the bow rests.

13. The protective cover according to claim 9, wherein the bow with the U-shaped line portion is attached positive-lockingly to the circumferential wall.

14. protective cover of a hand-held cut-off machine, the protective cover comprising:

a cover member having an interior;

at least two injection nozzles for spraying a cooling liquid into the interior arranged on the cover member;

a supply line for supplying the cooling liquid to the at least two injection nozzles;

a bow arranged outside of the cover member;

wherein the supply line has a line section that extends from a first one of the at least two injection nozzles to a second one of the at least two injection nozzles through the bow;

wherein the cover member has two opposed sidewalls and a circumferential wall and wherein the at least two injection nozzles are arranged opposite one another on the two opposed sidewalls, wherein the bow has a U-shaped line portion forming the line section of the supply line and wherein the U-shaped line portion of the bow surrounds the circumferential wall and partially the two opposed sidewalls;

wherein the bow with the U-shaped line portion is attached positive-lockingly to the circumferential wall;

wherein the circumferential wall has an integral radially projecting thicker portion that engages a correlated depression of the bow.

15. The protective cover according to claim 14, wherein the bow is screw-connected to the circumferential wall at the thicker portion.

16. protective cover of a hand-held cut-off machine, the protective cover comprising:

a cover member having an interior;

at least two injection nozzles for spraying a cooling liquid into the interior arranged on the cover member;

a supply line for supplying the cooling liquid to the at least two injection nozzles;

a bow arranged outside of the cover member;

wherein the supply line has a line section that extends from a first one of the at least two injection nozzles to a second one of the at least two injection nozzles through the bow;

wherein the line section in the bow is a flat pipe having a first outer surface facing the cover member and an opposed second outer surface facing away from the cover member, wherein the first outer surface rests areally against the cover member and the second outer surface, viewed in cross-section of the flat pipe, is positioned relative to a surface of the cover member at an angle of >90°.

17. The protective cover according to claim 1, wherein the at least two injection nozzles are integral parts of the bow.

18. The protective cover according to claim 17, wherein the bow is attached positive-lockingly to the cover member.

19. The protective cover according to claim 18, wherein the bow has hollow pegs that engage positive-lockingly the cover member.

20. The protective cover according to claim 1, wherein the supply line has a connecting member that is an integral part of the bow.

21. The protective cover according to claim 20, wherein the connecting member comprises an integral nipple.

\* \* \* \* \*